July 31, 1956 R. C. A. ELAND 2,757,343

COUPLING NETWORK FOR TELEVISION TUNERS

Filed Nov. 25, 1950 2 Sheets-Sheet 1

INVENTOR.
ROBERT C. A. ELAND
BY
Brown, Denk & Synnestvedt
AGENTS

July 31, 1956 R. C. A. ELAND 2,757,343

COUPLING NETWORK FOR TELEVISION TUNERS

Filed Nov. 25, 1950

2 Sheets-Sheet 2

INVENTOR.
ROBERT C. A. ELAND
BY
Brown, Denk & Synnestvedt
AGENTS

United States Patent Office 2,757,343
Patented July 31, 1956

2,757,343

COUPLING NETWORK FOR TELEVISION TUNERS

Robert C. A. Eland, Philadelphia, Pa., assignor to Philco Corporation, Philadelphia, Pa., a corporation of Pennsylvania Application November 25, 1950, Serial No. 197,625
6 Claims. (Cl. 333—26)

The invention herein described and claimed relates to television receivers, particularly to the so-called front end of the television receiver. The components which comprise the front end of the receiver, namely, the R.-F. amplifier, oscillator and mixer, are usually assembled together into a unit which is commonly referred to as the television tuner. The present invention relates, then, to an improvement in television tuners.

Due primarily to wide bandwidth requirements, a television receiver is especially subject to interference from spurious signals, and the prior art has endeavored to provide means to prevent such interference. As is well known, it is the duty of receiver's intermediate-frequency system to prevent interference from signals of adjacent channels by rejecting all unwanted signals whose frequencies are near to that of the channel desired to be received. The rejection, however, of unwanted signals whose frequencies are relatively far removed from that of the desired channel is the duty of the receiver's front end or tuner. For example, the tuner is relied upon to reject, among others, signals whose frequencies are much lower than those used in television transmission. Such lower-frequency signals include those employed in radio-broadcasting and short-wave transmission, as well as those identified with 60-cycle hum, ignition noise, diathermy interference, and many other types of interference. Signals radiating from diathermy equipment would be particularly troublesome if not rejected by the tuner, since diathermy equipment ordinarily uses 27-megacycle oscillations and this frequency is very close to the 26 megacycles conventionally employed at present in the intermediate-frequency systems of most television receivers.

In view of the above, the prior art has been constantly seeking to develop an improved television tuner capable of rejecting unwanted signals while at the same time providing adequate gain at the desired signal frequency. That the problem is not without difficulty is indicated by the wide variety of tuners presently being used by manufacturers of television receivers.

I have discovered that, by making a relatively simple modification to a prior-art type of tuner, a substantial and highly desirable improvement can be effected. The particular prior-art tuner referred to employs, between the antenna feed and the R.-F. amplifier, a so-called elevator circuit followed by a high-pass filter and a pair of wave traps. The elevator circuit comprises a pair of transmission lines which are connected either in series or in parallel, thereby to match the impedance of the R.-F. amplifier to that of either of the two types of antenna lead-in commonly employed in television-receiver installations, namely, the 300-ohm balanced twin-lead and the 75-ohm unbalanced coaxial-line. The high-pass filter functions to exclude, from the grid of the R.-F. amplifier, all signals whose frequencies are below that of the lowest frequency used in television transmission, while the wave traps function specifically to attenuate signals whose frequency happens to coincide, or nearly coincide, with the intermediate-frequency of the receiver.

I have found that by connecting the two transmission lines (which comprise the prior-art elevator circuit) between the antenna lead-in and the R.-F. amplifier in a different manner from that employed by the prior art, the television tuner can be made highly effective in rejecting unwanted frequencies without the necessity of using either the high-pass filter or the wave traps. And the gain of the modified tuner is excellent, being at least as good as that of the prior-art tuner.

The most important difference between the manner in which the prior art connects the elevator circuit and the manner in which I connect the elevator circuit resides in the fact that I avoid the direct feed-through connection from the antenna to the grid circuit of the R.-F. amplifier which characterized the prior-art circuit. I have found that, if the direct connection be avoided, the tuner is able to reject in a highly effective manner, and without the use of either the high-pass filter or wave-trap circuits, all frequencies other than the frequency, or substantially the frequency, to which the input circuit of the R.-F. amplifier is tuned.

The principal object, then, of the present invention is to provide improved impedance-matching energy-transfer means between the antenna lead-in and the R.-F. amplifier adapted to exclude unwanted signals from the grid of the R.-F. amplifier tube without the use of either the filter or wave-trap circuits employed by the prior art.

The manner in which the foregoing object is attained will be better understood from a consideration of the following detailed description wherein reference is made to the accompanying drawing in which.

Figure 1:
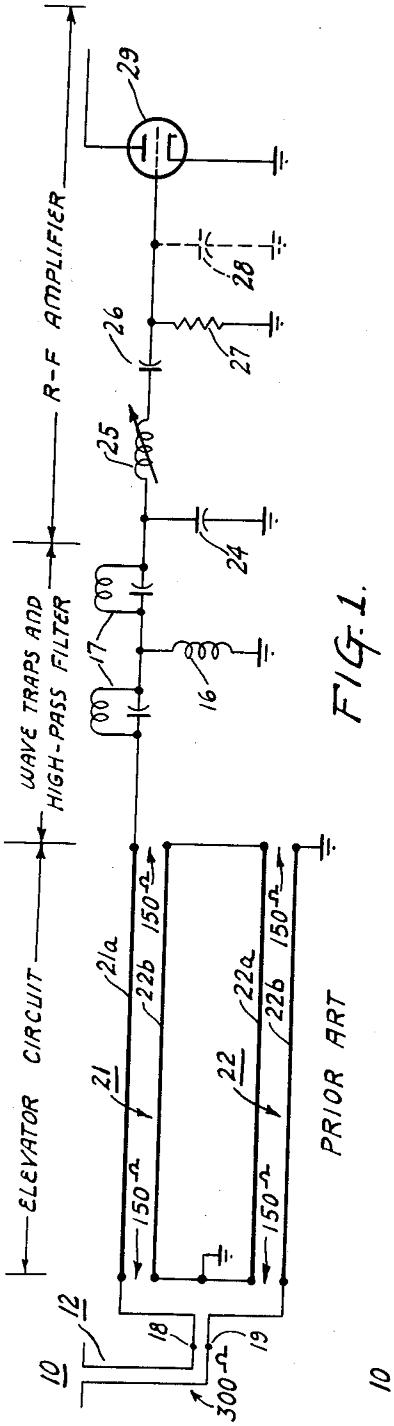
Figure 1 is a schematic representation of a portion of a prior-art television tuner showing the manner in which the prior art connected a 300-ohm balanced antenna lead-in to the grid circuit of the R.-F. amplifier.
Figure 2:
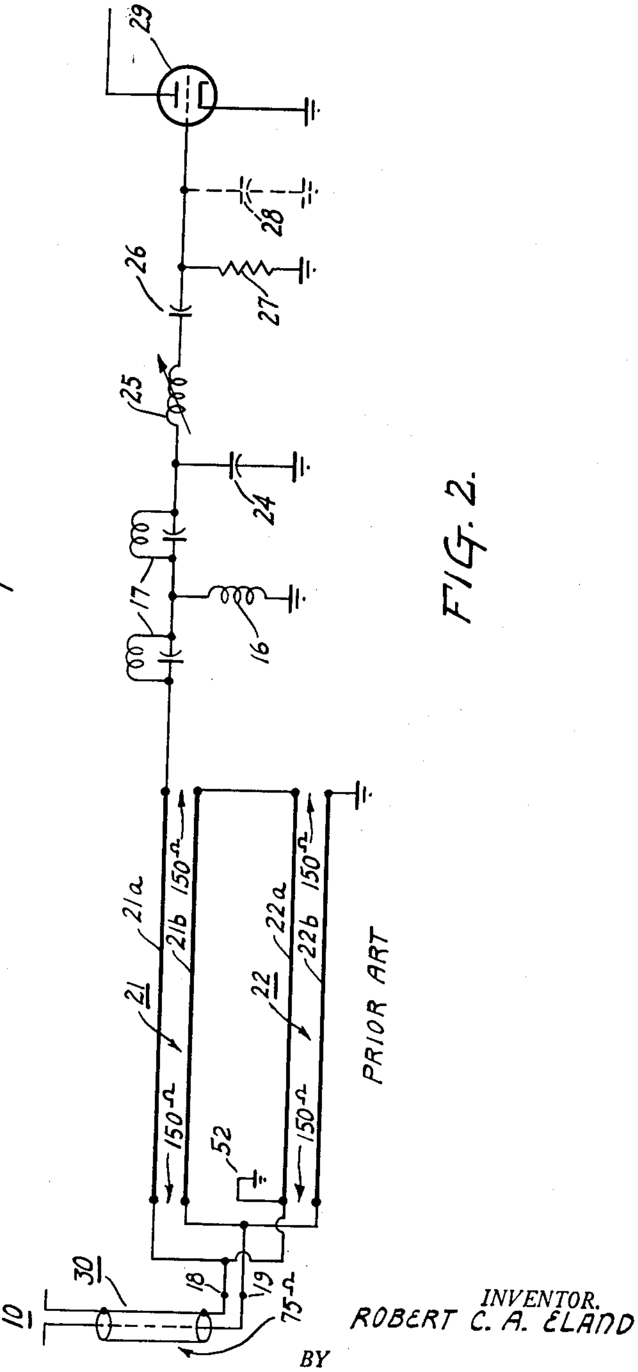
Figure 2 is a schematic representation of the same portion of the same prior-art television tuner shown in Figure 1 but showing the manner in which the prior art connected a 75-ohm unbalanced coaxial-line antenna lead-in to the grid circuit of the R.-F. amplifier.

As indicated above, Figures 1 and 2 show prior-art means for connecting a television antenna lead-in to the R.-F. amplifier of the television receiver. Figure 1 shows the connections employed by the prior art when the antenna lead-in is a 300-ohm balanced twin-lead, while Figure 2 shows the connections employed when the antenna lead-in is a 75-ohm unbalanced coaxial line. The circuit elements which effect the connection of the antenna lead-in to the R.-F. amplifier are the same in both figures, the difference being in the manner in which the circuit elements are connected.

It will be seen that in both Figure 1 and Figure 2 the lead-in from the antenna is connected to terminals 18, 19 and thence to the R.-F. amplifier by an elevator circuit, a high-pass filter, and a pair of wave traps. The elevator circuit is comprised of a pair of 150-ohm transmission lines 21 and 22 which, in Figure 1, are connected in series with the 300-ohm antenna lead-in 12, while in Figure 2, the two 150-ohm transmission lines are connected in parallel with the75-ohm coaxial-line lead-in 30. Hence, in Figure 1 the 300-ohm antenna lead-in sees a 300-ohm impedance when looking into the terminals 18, 19, while in Figure 2 the 75-ohm antenna lead-in sees an impedance of 75 ohms. Thus, both in Figure 1 and in Figure 2, the input impedance of the elevator circuit matches the impedance of the antenna lead-in, despite the fact that the impedance of the antenna lead-in in Figure 1 is four times as large as it is in Figure 2.

At the R.-F. amplifier end, the two transmission lines 21 and 22 are connected in series both in Figure 1 and in Figure 2, thus matching the impedance of an R.-F. amplifier whose input impedance is assumed to be of the order of 300 ohms.

When the prior-art circuit arrangement shown in Figure 1 is used, it is necessary to employ a high-pass filter 16 to reject all frequencies lower than those used in television transmission, otherwise severe interference from these lower frequencies results. It is also necessary, or at least highly desirable, to employ series-connected parallel-tuned wave traps 17 to attenuate specificially signals whose frequency corresponds substantially to the intermediate frequency of the television receiver.

The necessity of employing the high-pass filter 16 and wave traps 17 appears to result from the fact that in Figure 1 a direct feed-through connection exists from the antenna lead-in to the input circuit of the R.-F. amplifier by way of conductors 21*a* and 22*b* of transmission lines 21 and 22, respectively. In the prior-art circuit illustrated in Figure 2, no effective direct feed-through connection exists since conductor 21*a* is grounded at 52. Hence, considering Figure 2 alone, there would be no necessity to use a high-pass filter and wave-trap circuits to exclude the unwanted lower frequencies referred to hereinabove. Nevertheless, since the circuit connections shown in Figure 1 represent the limiting condition, i. e., in order that the tuner might provide satisfactory rejection of unwanted signals irrespective of whether a 300-ohm or a 75-ohm antenna lead-in be used, the prior art also employs the high-pass filter 16 and wave traps 17 when the elevator circuit is connected to a 75-ohm coaxial lead-in as shown in Figure 2.

In accordance with the concept of the present invention, the necessity of using the high-pass filter 16 and/or wave traps 17 is obviated, irrespective of whether the antenna lead-in be a 300-ohm twin-lead or a 75-ohm coaxial line, by connecting the two transmission lines (which comprise the elevator circuit) in a manner which avoids a direct connection between the antenna lead-in and the R. F. amplifier when the lead-in is a 300-ohm twin-lead. This will become clear from a consideration of Figure 3 wherein is illustrated the manner in which, in accordance with my invention, I connect the elevator circuit between the 300-ohm antenna lead-in and the R.-F. amplifier.

Figures 3, 4, 5:
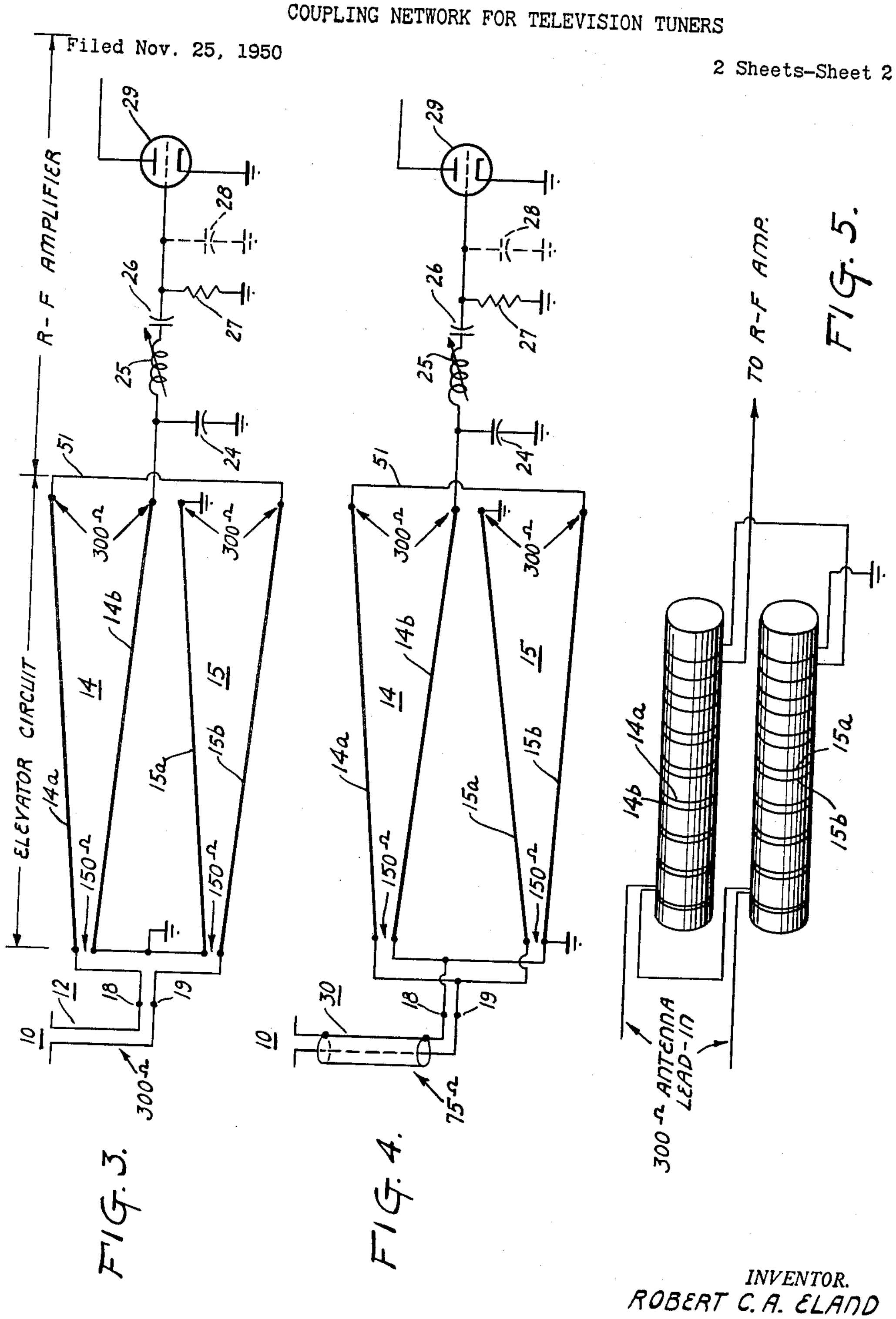
Figure 3 is a schematic representation of a portion of a television tuner showing the manner in which, in accordance with a preferred embodiment of the present invention, a 300-ohm balanced antenna lead-in is connected to the R.-F. amplifier.
Figure 4 is a schematic representation of the same portion of the same tuner shown in Figure 3 but showing the manner in which, in accordance with a preferred embodiment of the present invention, a 75-ohm unbalanced coaxial lead-in is connected to the R.-F. amplifier stage.
Figure 5 illustrates a physical form which the transmission lines shown in Figures 3 and 4 may preferably take.

In Figure 3, the elevator circuit is shown to comprise a pair of transmission lines 14 and 15 which are tapered, i. e., the spacing between the two conductors of each transmission line varies from one end to the other, being minimum at the antenna feed or input end and increasing gradually to maximum spacing at the R.-F. amplifier or output end. The employment of tapered transmission lines has been illustrated in Figure 3 to show the manner in which the impedance of the antenna lead-in may be readily matched to an R.-F. amplifier whose input impedance is substantially higher than that of the antenna lead-in. In Figure 3, it is assumed that the input impedance of the R.-F. amplifier is of the order of 600 ohms. Hence, the spacing of the transmission line conductors is increased until the 150-ohm impedance obtaining at the antenna or input end is increased to 300 ohms at the output end. And, since the two transmission lines are connected in series at the output ends, the 600-ohm input impedance of the R.-F. amplifier is effectively matched.

The extent to which transmission lines 14, 15 are tapered is, of course, dependent upon the relationship between the impedance of the antenna lead-in and the input impedance of the R.-F. amplifier. Where the input impedance of the R.-F. amplifier is of the order of 300 ohms, as in the prior art circuits shown in Figures 1 and 2, it is, of course, unnecessary to taper the transmission lines in order to match the impedance of the R.-F. amplifier to that of either a 300-ohm twin-lead or a 75-ohm coaxial-line antenna lead-in.

Consider now the manner in which, according to my invention, the elevator circuit comprised of transmission lines 14 and 15 is connected between the 300-ohm antenna lead-in 12 and the R.-F. amplifier. As may be readily seen in Figure 1, one conductor of lead-in 12 is connected, by way of input terminal 18, to one conductor, 14*a*, of transmission line 14, while the other lead-in conductor is connected by way of input terminal 19 to one conductor 15*b*, of the other tapered transmission line, 15. The output ends of conductors 14*a* and 15*b*, respectively, are connected together by the low-resistance connection 51. The input ends of the other conductors, 14*b* and 15*a*, of transmission lines 14 and 15, respectively, are connected together and preferably grounded, while the output ends of these conductors comprise the terminals across which the output of the elevator circuit is taken.

When the elevator circuit is connected as shown in Figure 3, and described above, there is no direct connection between the antenna lead-in and the grid circuit of the R.-F. amplifier tube. The transformation of signal is dependent, therefore, upon the capacitive and inductive coupling of the conductors of the elevator circuit. I have found this coupling to be highly inefficient except at the frequency to which the grid circuit of the R.-F. amplifier is tuned. Stated conversely, when the connections shown in Figure 3 are employed, I have found that substantially the only frequency which is efficiently transferred from the antenna lead-in to the R.-F. amplifier is that frequency which corresponds to the frequency to which the grid circuit of the R.-F. amplifier is tuned. Hence, it is unnecessary to provide either a high-pass filter or trap circuits to exclude unwanted signals from the grid of the amplifier tube.

Figure 4 shows the arrangement employed, in accordance with the present invention, when the antenna lead-in is a 75-ohm unbalanced coaxial line instead of a 300-ohm twin-lead line. The connections shown in Figure 4 are actually the same as those used by the prior art as illustrated in Figure 2, the only significant difference between Figures 2 and 4 being in the omission, in Figure 4, of the high-pass filter and wave trap circuits, such omission being made possible by reason of the improvement made in the circuit of Figure 3. In addition, in Figure 4, the elevator circuit is comprised of a pair of tapered transmission lines, as distinguished from non-tapered transmission lines.

It will be seen, then, that by employing the present invention, a real economy may be effected as represented by the omission of high-pass filter 16 and wave traps 17 from the prior art circuits shown in Figures 1 and 2. And, as indicated in Figures 3 and 4, this saving is realized irrespective of whether the antenna lead-in is a 300-ohm twin-lead or a 75-ohm coaxial line.

Both in the prior art and in accordance with the present invention, the transmission lines of which the elevator circuit is comprised may, in order to save space, preferably be wound in a double-threaded spiral upon a cylindrical coil form. If the transmission lines be tapered, as indicated in Figures 3 and 4, the spacing between the conductors of each transmission line is increased gradually, as by varying gradually the winding pitch of one of the conductors of the double-threaded spiral, as shown in Figure 5, with maximum spacing being reached at the output end of the line.

Perhaps mention should be made of the fact that in Figures 1 to 4, the R.-F. amplifier stage has been shown as having a series-tuned input circuit, said circuit being comprised of the shunt capacitor 24, the variable series inductance 25, the blocking capacitor 26, the grid-leak 27, and the distributed input capacitance 28 of tube 29. While the benefit to be derived from the present invention is greater in a tuner whose R.-F. amplifier has a series-tuned input circuit, the invention may also be employed, if desired, in a tuner whose R.-F. amplifier has a parallel-tuned input circuit. A series-tuned input circuit is, however, preferably employed because a larger voltage step-up may be obtained than with a parallel-tuned input circuit. However, in the absence of the present invention, a series-tuned input circuit does have the disadvantage that a separate high-pass filter must be provided to exclude unwanted lower-frequency signals, whereas, in the case of the parallel-tuned input circuit, the inductance element provides the low-frequency bypass to ground, and the addition of a separate high-pass filter element is unnecessary. The application of the present invention to tuners employing a parallel-tuned input circuit in the R.-F. amplifier does, however, permit omission of the wave traps which would otherwise be necessary.

Having described my invention, I claim:

1. In a television receiver; a radio-frequency amplifier having input terminals and tunable over a wide band of frequencies; a pair of antenna terminals for connecting antenna lead-in conductors thereto; means connecting said pair of antenna terminals to said input terminals of said radio-frequency amplifier, said connecting means consisting of a first open wire transmission line comprising first and second closely adjacent conductors, a second open wire transmission line comprising third and fourth closely adjacent conductors, the spacing between said first and second transmission lines being substantially greater than that between said first and second conductors and between said third and fourth conductors, respectively, the input end of said first conductor being connected to one of said antenna terminals and the input end of said third conductor being connected to the other of said antenna terminals, the output ends of said first and third conductors being shorted together, the input ends of said second and fourth conductors being shorted together; the output ends of said second and fourth conductors being connected directly to the input terminals of said radio frequency amplifier, the coupling between said antenna terminals and said output ends of said second and fourth conductors being dependent solely on the mutual coupling between said first and second conductors and between said third and fourth conductors, respectively.

2. In a television receiver, a radio frequency amplifier having input terminals and tunable over a wide band of frequencies; a pair of antenna terminals for connecting antenna lead-in conductors thereto; means connecting said pair of antenna terminals to said input terminals of said radio frequency amplifier, said connecting means comprising first and second transmission lines, each of said transmission lines comprising first and second conductors closely adjacent to each other, the spacing between said first and second transmission lines being substantially greater than that between the conductors forming said transmission lines, the first and second conductors of said first transmission line being wound in a double-threaded spiral on a first coil form, the first and second conductors of said second transmission line being wound in a double-threaded spiral on a second coil form, the input end of said first conductor of said first transmission line being connected to one of said antenna terminals and the input end of said first conductor of said second transmission line being connected to the other of said antenna terminals, the output ends of said two first conductors being shorted together, the input ends of said second conductors of said first and second transmission lines being shorted together; and means for applying the signals developed across the output ends of said second conductors to said input terminals of said radio frequency amplifier.

3. Apparatus as claimed in claim 2 characterized by the fact that the spacing between said first and second conductors of both of said transmission lines increases gradually from the input to the output ends.

4. Apparatus as claimed in claim 2 characterized in that the shorted ends of said second conductors of said first and second transmission lines are connected to a point of fixed reference potential.

5. In a television receiver; a radio frequency amplifier having input terminals and tunable over a wide band of frequencies; a two-conductor antenna lead-in; means connecting said antenna lead-in to said input terminals of said radio frequecy amplifier, said connecting means comprising, first and second transmission lines, each of said transmission lines comprising first and second conductors, said first and second conductors being closely adjacent to each other, the first and second conductors of said first transmission line being wound in a double-threaded spiral on a first coil form, the first and second conductors of said second transmission line being wound in a double-threaded spiral upon a second coil form, the spacing between said first and second coil forms being substantially greater than the spacing between said transmission line conductors, thereby to cause the spacing between said first and second transmission lines to be substantially greater than that between the conductors forming said transmission lines; the input end of said first conductor of said first transmission line being connected to one conductor of said antenna lead-in and the input end of said first conductor of said second transmission line being connected to the other conductor of said antenna lead-in, the output ends of said first conductors being shorted together, the input ends of said second conductors of said first and second transmission lines being shorted together; and means for applying the signals developed across the output ends of said conductors to said input terminals of said radio frequency amplifier.

6. Apparatus as claimed in claim 5 characterized in that the spacing between the conductors of said transmission lines increases gradually from the input to the output ends.

References Cited in the file of this patent

UNITED STATES PATENTS

| | | |
|---|---|---|
| 2,204,712 | Wheeler | June 18, 1940 |
| 2,368,694 | Watts | Feb. 6, 1945 |
| 2,509,057 | Guanella | May 23, 1950 |
| 2,554,295 | Cooper | May 22, 1951 |

FOREIGN PATENTS

| | | |
|---|---|---|
| 476,701 | Great Britain | Dec. 14, 1937 |